US011298926B2

(12) United States Patent
Tashiro et al.

(10) Patent No.: US 11,298,926 B2
(45) Date of Patent: Apr. 12, 2022

(54) MULTILAYERED CONTAINERS

(71) Applicant: TOYO SEIKAN GROUP HOLDINGS, LTD., Tokyo (JP)

(72) Inventors: Yuuki Tashiro, Yokohama (JP); Takayuki Ishihara, Yokohama (JP); Azusa Otsuki, Yokohama (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 69 days.

(21) Appl. No.: 16/493,196

(22) PCT Filed: Mar. 14, 2018

(86) PCT No.: PCT/JP2018/010075
§ 371 (c)(1),
(2) Date: Sep. 11, 2019

(87) PCT Pub. No.: WO2018/168965
PCT Pub. Date: Sep. 20, 2018

(65) Prior Publication Data
US 2020/0017672 A1 Jan. 16, 2020

(30) Foreign Application Priority Data

Mar. 15, 2017 (JP) .............................. JP2017-050371
Jul. 21, 2017 (JP) .............................. JP2017-141485

(51) Int. Cl.
| *B32B 1/02* | (2006.01) |
| *B32B 27/32* | (2006.01) |
| *B32B 27/30* | (2006.01) |
| *B32B 7/12* | (2006.01) |
| *B32B 27/08* | (2006.01) |
| *B65D 65/40* | (2006.01) |
| *C08L 23/12* | (2006.01) |

(52) U.S. Cl.
CPC .............. *B32B 27/306* (2013.01); *B32B 1/02* (2013.01); *B32B 7/12* (2013.01); *B32B 27/08* (2013.01); *B32B 27/32* (2013.01); *B65D 65/40* (2013.01); *C08L 23/12* (2013.01); *B32B 2250/246* (2013.01); *B32B 2439/00* (2013.01); *C08L 2201/14* (2013.01); *C08L 2205/025* (2013.01); *C08L 2205/03* (2013.01); *C08L 2207/10* (2013.01)

(58) Field of Classification Search
CPC .. B32B 1/02; B32B 7/12; B32B 27/08; B32B 27/306; B32B 27/32; B32B 2250/246; B32B 2439/00; C08L 23/12; C08L 2201/14; C08L 2205/025; C08L 2205/03; C08L 2207/10
See application file for complete search history.

(56) References Cited

U.S. PATENT DOCUMENTS

| 6,372,359 B1 | 4/2002 | Hayashi et al. |
| 6,503,588 B1 * | 1/2003 | Hayashi ................. B32B 27/30 428/36.7 |
| 9,956,716 B2 | 5/2018 | Ishihara et al. |
| 2005/0085785 A1 | 4/2005 | Shang et al. |
| 2010/0136271 A1 | 6/2010 | Ishihara et al. |
| 2015/0251390 A1 | 9/2015 | Ishihara et al. |

FOREIGN PATENT DOCUMENTS

| CN | 1902277 A | 1/2007 |
| EP | 2 898 871 A1 | 7/2015 |
| JP | 06-091827 A | 4/1994 |
| JP | 09-109340 A | 4/1997 |
| JP | 10-244610 A | 9/1998 |
| JP | 2000-318095 A | 11/2000 |
| JP | 2001-058374 A | 3/2001 |
| JP | 2004-276240 A | 10/2004 |
| JP | 2011-126544 A | 6/2011 |
| JP | 4894066 B2 | 3/2012 |
| JP | 2015-058644 A | 3/2015 |
| JP | 2017-24345 A | 2/2017 |
| WO | 2014/051093 A1 | 4/2014 |

OTHER PUBLICATIONS

Communication dated Oct. 10, 2020, from the State Intellectual Property Office of the P.R.C. in application No. 201880017851.3.
Extended European Search Report dated Mar. 2, 2021, issued by the European Patent Office in application No. 18767278.7.
International Search Report for PCT/JP2018/010075 dated Jun. 5, 2018 [PCT/ISA/210].

* cited by examiner

*Primary Examiner* — Walter Aughenbaugh
(74) *Attorney, Agent, or Firm* — Sughrue Mion, PLLC

(57) ABSTRACT

A gas-barrier multilayered container having (i) a layer of a propylene type polymer which chiefly includes a homopolypropylene having an isotactic index of not less than 93%, and (ii) a layer of an ethylene-vinyl alcohol copolymer having not less than two crystal melting peak temperatures. Also disclosed is a lustrous and shock-resistant multilayered container having at least (i) an outermost layer of a propylene type polymer A which chiefly includes a homopolypropylene having a melt flow rate of 2.0 to 10.0 g/10 min., and (ii) an inner layer of a propylene type polymer B which chiefly includes a homopolypropylene having a melt flow rate of not more than 1.0 g/10 min.

10 Claims, 2 Drawing Sheets

MULTILAYERED CONTAINERS

CROSS REFERENCE TO RELATED APPLICATIONS

This application is a National Stage Entry of International Application No. PCT/JP2018/010075 filed Mar. 14, 2018, claiming priority based on Japanese Patent Application No. 2017-050371 filed Mar. 15, 2017 and Japanese Patent Application No. 2017-141485 filed Jul. 21, 2017.

TECHNICAL FIELD

This invention relates to a multilayered container obtained by using a propylene type polymer as a chief starting material. More specifically, the invention relates to a heat-formed multilayered container having a layer of a propylene type polymer and a layer of an ethylene-vinyl alcohol copolymer, featuring excellent formability and appearance, as well as to a multilayered container having excellent luster and shock resistance.

BACKGROUND ART

There have heretofore been widely known multilayered containers having inner and outer layers of an olefin type resin and an intermediate layer of an ethylene-vinyl alcohol copolymer.

The multilayered containers are, generally, formed by the direct-blow forming, melt forming such as injection forming, or heat forming such as vacuum forming or air pressure forming (patent document 1, etc.).

When heat-formed, the multilayered containers can be produced in good productivity featuring such advantages as excellent transparency and mechanical strength. With the heat-forming, however, the containers must be reheated up to a temperature higher than the melting point thereof posing a difficulty against efficiently forming the deep-draw-formed containers that have particularly large ratios (L/D) of heights (L) and mouth diameters (D).

In order to solve the above problem, there has been proposed a heat-formed container that features a deep-drawn structure having a ratio of depth/mouth diameter of the container of not less than 1, the container being obtained by air pressure-forming, in solid phase, a polypropylene type sheet that comprises a propylene type resin composition having (i) a melt flow rate (MFR) (temperature of 230° C., load of 2.16 kg) of 0.2 to 1.5 g/10 min. and (ii) a melt peak temperature of not lower than 165° C. as measured by using a differential scanning calorimeter (DSC) (patent document 2).

Further, as a container having luster on the outer surface thereof, there has been proposed a multilayered container having an outer layer that comprises a homopolypropylene or a propylene type random copolymer.

When it comes to the multilayered container having such excellent luster, the propylene type polymer that is used to impart luster to the container, usually, has poor strength against the shock when it is dropped. In order to improve the mechanical strength of the multilayered container, therefore, there has been proposed to use, as the inner layer, a polyethylene resin layer having excellent shock resistance (patent document 3).

Further, a patent document 4 described below proposes a multilayered blow-formed container having favorable luster and surface roughness on the surface thereof, the container including:

an outer layer of a polypropylene type resin (X) obtained by using a metallocene catalyst and having a melt flow rate (hereinafter simply as "MFR" which is a value measured at 230° C.) and a ratio (MW/Mn) of a weight average molecular weight (MW) and a number average molecular weight (Mn) that are lying within specific ranges; and an intermediate layer of a polypropylene type resin (Y) obtained by using a metallocene catalyst and having an MFR and a ratio MW/Mn that are lying within specific ranges;

the MFR value of the polypropylene type resin (X) being larger than the MFR value of the polypropylene type resin (Y).

PRIOR ART DOCUMENTS

Patent Documents

Patent document 1: Japanese Patent No. 4894066
Patent document 2: JP-A-2011-126544
Patent document 3: JP-A-9-109340
Patent document 4: JP-A-2015-58644

OUTLINE OF THE INVENTION

Problems that the Invention is to Solve

Even in the heat-formed container described in the above patent document 2, when the ethylene-vinyl alcohol copolymer was used as the intermediate layer, the intermediate layer comprising the ethylene-vinyl alcohol copolymer was often broken or became uneven in thickness due the fact that the ethylene-vinyl alcohol copolymer possessed stretching property different from that of the olefin type resin that constituted the inner and outer layers. Therefore, the gas-barrier property was not obtained as desired and, besides, the container was not fully satisfactory from the standpoint of appearance and formability.

Moreover, when the outer layer was formed by using the propylene type polymer having excellent luster and the inner layer was formed by using the polyethylene as taught in the above-mentioned patent document 3, the multilayered container could acquire an improved shock resistance. However, the polyethylene still has inferior heat resistance to the propylene type polymer leaving, therefore, such a problem that the container could not be retort-sterilized. Further, when the polyethylene was used being blended with the propylene type polymer, compatibility was poor between the polyethylene and the propylene type polymer arousing another problem in that the transparency became poor. This could become a problem when there was also used a reground resin for forming a multilayered container in addition to using the propylene type polymer and the polyethylene.

Moreover, though the multilayered container described in the above patent document 4 featured very excellent luster, it was not still fully satisfactory in regard to the shock resistance.

It is, therefore, an object of the present invention to provide a multilayered container having a layer of a propylene type polymer and a layer of an ethylene-vinyl alcohol copolymer, the multilayered container being capable of exhibiting excellent gas-barrier property possessed by the ethylene-vinyl alcohol copolymer to a sufficient degree and featuring excellent appearance such as transparency and thickness profile as well as excellent formability.

Another object of the present invention is to provide a multilayered container having excellent luster and shock resistance, and capable of being subjected to even the retort-sterilization or the like treatment.

Means for Solving the Problems

According to the present invention, there is provided a multilayered container having at least a layer of a propylene type polymer which chiefly comprises a homopolypropylene having an isotactic index of not less than 93%, and a layer of an ethylene-vinyl alcohol copolymer having not less than two crystal melting peak temperatures.

In the first multilayered container of the present invention, it is desired that:
1. The layer of the ethylene-vinyl alcohol copolymer comprises a blend of two or more kinds of ethylene-vinyl alcohol copolymers having different ethylene contents, and has the crystal melting peak temperatures which are at least not lower than 180° C. and not higher than 170° C.;
2. The layer of the ethylene-vinyl alcohol copolymer comprises a blend of an ethylene-vinyl alcohol copolymer having an ethylene content of 20 to 35 mol % and an ethylene-vinyl alcohol copolymer having an ethylene content of 36 to 50 mol %, at a blending ratio of 90:10 to 50:50;
3. The propylene type polymer contains a nucleating agent;
4. The layer constitution comprises a layer of the propylene type polymer/a reground resin layer/an adhesive resin layer/an intermediate layer of an ethylene-vinyl alcohol copolymer/an oxygen-absorbing layer/an intermediate layer of an ethylene-vinyl alcohol copolymer/an adhesive resin layer/an adsorbent-containing layer/an inner layer of the propylene type polymer in this order from the outer side; and
5. The propylene type polymer chiefly comprises a homopolypropylene having a melt flow rate of not more than 2.0 g/10 min.

According to the present invention, further, there is provided a multilayered container having at least an outermost layer of a propylene type polymer A which chiefly comprises a homopolypropylene having a melt flow rate of 2.0 to 10.0 g/10 min., and an inner layer of a propylene type polymer B which chiefly comprises a homopolypropylene having a melt flow rate of not more than 1.0 g/10 min.

In this specification, numerical values of the melt flow rates (hereinafter often "MFRs") of the propylene type polymers comply with the JIS K 7210, and are the values measured at 230° C. under the load of 2.16 kg.

In the second multilayered container of the present invention, it is desired that:
1. The multilayered container has an intermediate layer of an ethylene-vinyl alcohol copolymer formed between the outermost layer and the inner layer, and a layer containing the propylene type polymer B formed between the intermediate layer of the ethylene-vinyl alcohol copolymer and the outermost layer;
2. An isotactic index of not less than 95% is possessed by the homopolypropylene which is the chief component of the propylene type polymer A and the propylene type polymer B;
3. The ratio of thickness of the outermost layer is not more than 20% relative to the total thickness of the container;
4. The propylene type polymer A and the propylene type polymer B contain a nucleating agent;
5. The multilayered container has an intermediate layer of an ethylene-vinyl alcohol copolymer which comprises a blend of two or more kinds of ethylene-vinyl alcohol copolymers having different ethylene contents; and
6. The layer constitution comprises the outermost layer/a reground resin layer/an adhesive resin layer/an intermediate layer of an ethylene-vinyl alcohol copolymer/an oxygen-absorbing layer/an intermediate layer of an ethylene-vinyl alcohol copolymer/an adhesive resin layer/an adsorbent-containing layer/the inner layer in this order from the outer side.

Effects of the Invention

The first multilayered container of the present invention includes the inner and outer layers of a propylene type polymer comprising chiefly a highly crystalline homopolypropylene having an isotactic index of not less than 93%, features improved formability by effectively preventing the drawdown at the time of heat forming, and to which excellent transparency can be imparted. Owing to its high degree of crystallinity, furthermore, the multilayered container features improved mechanical strength and excellent shock resistance.

Moreover, the stretching property of the ethylene-vinyl alcohol copolymer (hereinafter often referred to simply as "EVOH") can be improved without impairing its gas-barrier property since the EVOH has not less than two crystal melting peak temperatures. As a result, the intermediate layer comprising the EVOH can be effectively prevented from undergoing the breakage or from becoming uneven in thickness. This, therefore, enables the gas-barrier property inherent in the EVOH to be fully exhibited.

The first multilayered container is produced through the air pressure forming and features excellent transparency as well as uniform thickness. The layer of the EVOH does not undergo the breakage or does not become uneven in thickness, and hence exhibits excellent gas-barrier property inherent in the EVOH to a sufficient degree. Therefore, the container is also provided with very excellent mechanical strength (shock resistance).

Moreover, the first multilayered container has the layer of EVOH that features excellent stretching property permitting the ratio L/C (D is a mouth diameter and L is a height) to lie in a range of 0.1 to 5. Therefore, even when stretched to a high degree, the container is well formed without being unevenly stretched. Besides, the EVOH layer is continuously formed maintaining uniform thickness, and features excellent appearance and gas-barrier property.

The second multilayered container has the outer layer of a propylene type polymer A that chiefly comprises a homopolypropylene having an MFR of 2.0 to 10.0 g/10 min. Therefore, the multilayered container is imparted with excellent luster in the outer surface thereof. The multilayered container, further, has at least the inner layer of a propylene type polymer B that chiefly comprises a hopolypropylene having a melt flow rate of not more than 1.0 g/10 min. Therefore, the multilayered container can be imparted with excellent shock resistance.

Further, unlike the conventional multilayered containers that use the propylene type polymer as well as the polyethylene, the multilayered container of the present invention uses no polyethylene. Therefore, the multilayered container of the present invention has excellent heat resistance and is capable of being subjected to even the retort-sterilization.

Further, even when there is used a reground resin that is generated at the time of heat-forming the multilayered containers relying on, for example, the air pressure forming, excellent transparency is realized since the multilayered container uses no polyethylene, i.e., contains no blend of the propylene type polymer and the polyethylene that are poorly transparent.

Moreover, the layer of the propylene type polymer having a melt flow rate of not more than 1.0 g/10 min. is provided not only as the inner layer but also as the layer lies on the inside of the outer layer. This makes it possible to further improve the shock resistance.

Figure 1:
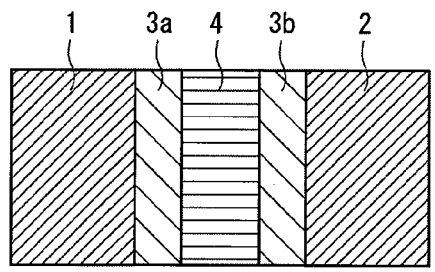
FIG. 1 It is a view illustrating a layer constitution of a first multilayered container of the present invention.

MODES FOR CARRYING OUT THE INVENTION (First Multilayered Container)

It is an important feature of the present invention that the first multilayered container (hereinafter often referred to as "heat-formed container") includes at least a layer of a propylene type polymer comprising chiefly a homoplypropylene having an isotactic index of not less than 93% and a layer of an ethylene-vinyl alcohol copolymer having not less than two crystal melting peak temperatures.

[Propylene Type Polymers]

In the first multilayered container of the present invention, it is desired that the propylene type polymer chiefly comprises a highly crystalline homopolypropylene having an isotactic index of not less than 93% and, specifically, 96 to 99%. In other words, it is desired that the propylene type polymer contains the homopolypropylene in an amount of not less than 90% by weight and, specifically, in an amount of 100% by weight.

Here, the isotactic index is an isotactic fraction of the pentad units in a polypropylene molecular chain as measured relying on the nuclear magnetic resonance spectra (13C-NMR) by using an isotopic carbon. In the invention, the homopolypropylene that constitutes the propylene type polymer has the isotactic index that lies in the above-mentioned range contributing to improving the formability by effectively preventing the drawdown during the heat forming and, therefore, makes it possible to obtain a container that has uniform thickness, high degree of transparency and excellent appearance as well as shock resistance.

As the other propylene type polymers that can be contained in the propylene type polymer, there can be exemplified propylene.α-olefin random copolymers. As the α-olefin in the propylene.α-olefin random copolymers, there can be exemplified ethylene, butene-1, pentene-1, hexene-1, octene-1, and 4-methylpentene-1. Specifically, there can be exemplified a propylene.ethylene random copolymer that contains the propylene structural units in an amount of not less than 80% by weight and, specifically, 95 to 99% by weight, the remaining structural units being α-olefin and, specifically, ethylene.

In the invention, it is desired from the standpoint of shock resistance that the homopolypropylene which is the chief component of the propylene type polymer is a homopolypropylene having an MFR in a range of 0.3 to 3.0 g/10 min. and, specifically, 0.3 to 1.0 g/10 min. When the MFR is larger than the above range, the heat-formed container might have inferior shock resistance to that of when the MFR is within the above-mentioned range. When the MFR is too small, on the other hand, the fluidity may decrease and the formability may be impaired.

The propylene type polymer may be added with additives that have been customarily used for the resins, such as heat stabilizer, antioxidant, lubricant, inorganic filler, coloring agent and the like according to the known recipe. Here, however, it is particularly desired to add a nucleating agent from the standpoint of further improving the crystallinity of the propylene type polymer and, therefore, to further improve the formability and transparency thereof. Upon adding the nucleating agent, the melting point rises and hence the drawdown decreases during the forming, making it possible to assure uniform thickness of the container. Moreover, since the crystalizing temperature rises, too, it becomes allowable to take out the containers at high temperatures during the forming contributing to improving the forming cycle.

The nucleating agent is the one that is not compatible with the propylene type polymer. Though not limited thereto only, there can be used any known nucleating agents which may be organic nucleating agents such as metal salts of such organic carboxylic acid as benzoic acid, malonic acid or succinic acid, i.e., lithium salt, sodium salt, potassium salt, magnesium salt, calcium salt, and organic phosphate ester, or inorganic nucleating agents such as talc, alum, silica, titanium oxide and calcium oxide. It is, however, specifically desired to use an organic phosphate.

The nucleating agent is added, desirably, in an amount of 0.001 to 5 parts by weight, specifically, 0.01 to 0.5 parts by weight and, more specifically, 0.1 to 0.5 parts by weight per 100 parts by weight of the propylene type polymer. When the amount of the nucleating agent is smaller than the above range, the crystallization cannot be increased to a sufficient degree. When the amount thereof is larger than the above range, on the other hand, the formability may be impaired.

[Ethylene-Vinyl Alcohol Copolymers]

In the first multilayered container, the layer of the ethylene-vinyl alcohol copolymer (EVOH) has not less than two crystal melting peak temperatures making it possible, as described above, to improve the stretching property without impairing excellent gas-barrier property.

The layer of the EVOH is, desirably, formed by using a blend of two or more kinds of EVOHs having different crystal melting peak temperatures. Specifically, it is desired to use a blend of two kinds of EVOHs, i.e., an EVOH having a crystal melting peak temperature of not lower than 180° C. and an EVOH having a crystal melting peak temperature of not higher than 170° C.

As the EVOH having the crystal melting peak temperature of not lower than 180° C., there can be exemplified an EVOH having an ethylene content in a range of 20 to 35 mol % and, specifically, 25 to 30 mol % while as the EVOH having the crystal melting peak temperature of not higher than 170° C., there can be exemplified an EVOH having an ethylene content in a range of 36 to 50 mol % and, specifically, 40 to 45 mol %.

As the ethylene content increases in the EVOH, in general, the stretching property becomes more excellent while the gas-barrier property becomes poor. As the ethylene content decreases therein, on the other hand, the stretching property becomes poor while the gas-barrier property improves. In the present invention, at least two kinds of EVOHs having the ethylene contents in the above-mentioned ranges are blended together to form a layer having an excellent gas-barrier property. The layer of the EVOH is formed maintaining a uniform thickness and continuously without breakage. Therefore, excellent gas-barrier property inherent in the EVOH can be reliably exhibited without being impaired.

It is desired that the EVOH layer comprises an EVOH having an ethylene content of 20 to 35 mol % and an EVOH having an ethylene content of 36 to 50 mol % at a blending ratio (weight ratio) of 90:10 to 50:50 and, specifically, 80:20 to 60:40. This makes it possible to impart the above-mentioned gas-barrier property and the stretching property maintaining good balance enabling, as a result, to express excellent gas-barrier property inherent in the EVOHs to a maximum degree.

The EVOHs should have molecular weights large enough to form films and should, usually, have intrinsic viscosities of, desirably, not less than 0.01 dl/g and, specifically, not less than 0.05 dl/g as measured in a mixed solvent of phenol and water at a weight ratio of 85/15 at a temperature of 30° C.

(Multilayered Structures)

The first multilayered container is essentially constituted by the layer of the propylene type polymer and the layer of the EVOH, i.e., may be a heat-formed container comprising the two layers. Preferably, however, the first multilayered container is basically constituted by the inner layer and the outer layer of the above-mentioned propylene type polymer and, further, by the gas-barrier EVOH layer as the intermediate layer. More desirably, the first multilayered container, further, includes other layers that have been known per se. such as an oxygen-absorbing layer, an adhesive layer, a reground resin layer, an adsorbent-containing layer, and the like layers. Described below are some examples of the layer constitution though the invention is not limited thereto only.

FIG. 1 is a view illustrating a multilayered structure of the first multilayered container which, in this case, includes an outer layer 1 and an inner layer 2 of the propylene type polymer comprising chiefly a homopolypropylene having an isotactic index of not less than 93%, and an intermediate layer which is the gas-barrier layer of EVOH having not less than two crystal melting peak temperatures. The layer constitution is in order of, from the outer layer side, outer layer 1/adhesive layer 3a on the outer layer side/gas-barrier layer 4/adhesive layer 3b on the inner layer side/inner layer 2.

Figure 2:
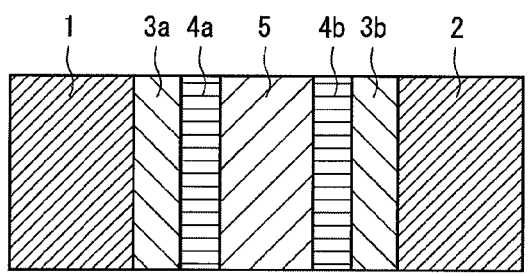
FIG. 2 It is a view illustrating another layer constitution of the first multilayered container of the present invention.

An embodiment shown in FIG. 2 corresponds to the embodiment shown in FIG. 1 but in which two gas-barrier EVOH layers are formed, and between which an oxygen-absorbing layer is formed. Namely, the embodiment comprises outer layer 1/adhesive layer 3a on the outer layer side/gas-barrier layer 4a/oxygen-absorbing layer 5/gas-barrier layer 4b/adhesive layer 3b on the inner layer side/inner layer 2. In this case, oxygen that permeates through is trapped by the oxygen-absorbing layer to further improve the gas-barrier property.

Figure 3:
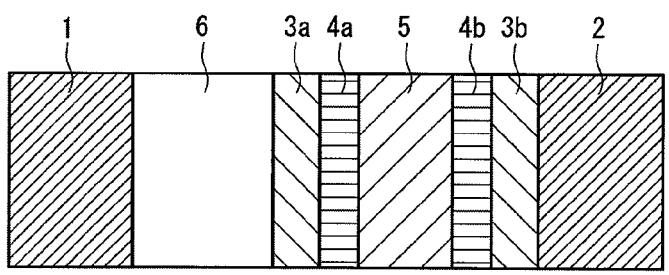
FIG. 3 It is a view illustrating a further layer constitution of the first multilayered container of the present invention.

An embodiment shown in FIG. 3 corresponds to the embodiment shown in FIG. 2 but in which a reground resin layer 6 is formed between the outer layer 1 and the adhesive layer 3a on the side of the outer layer, the reground resin layer 6 being formed by using the reground resin that generates at the time of forming the containers. Namely, the embodiment comprises outer layer 1/reground resin layer 6/adhesive layer 3a on the outer layer side/gas-barrier layer 4a/oxygen-absorbing layer 5/gas-barrier layer 4b/adhesive layer 3b on the inner layer side/inner layer 2.

Figure 4:
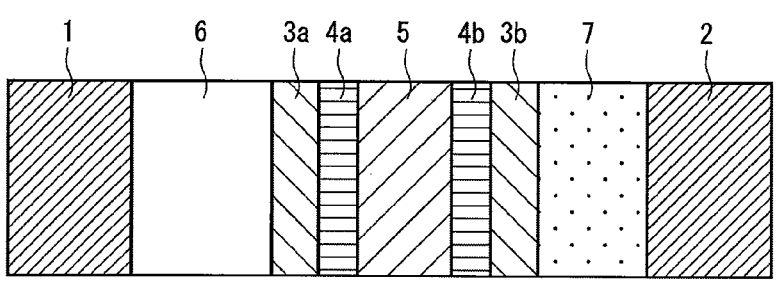
FIG. 4 It is a view illustrating a still further layer constitution of the first multilayered container of the present invention.

Further, FIG. 4 shows an embodiment that corresponds to the embodiment shown in FIG. 3 but in which a layer 7 containing an adsorbent such as zeolite or the like is formed between the adhesive layer 3b on the side of the inner layer and the inner layer 2. Namely, the embodiment comprises outer layer 1/reground resin layer 6/adhesive layer 3a on the outer layer side/gas-barrier layer 4a/oxygen-absorbing layer 5/gas-barrier layer 4b/adhesive layer 3b on the inner layer side/adsorbent-containing layer 7/inner layer 2. As a result of forming the adsorbent-containing layer 7 that contains an adsorbent such as zeolite or the like on the side of the inner layer, it is allowed to improve the property for retaining the flavor of the content.

As for the thicknesses of the layers of the first multilayered container, it is desired that the thicknesses of the layers of the propylene type polymer (inner layer and outer layer) are each in a range of 280 to 380 μm and, specifically, 310 to 340 μm, and the thickness of the EVOH layer is in a range of 20 to 80 μm and, specifically, 40 to 60 μm. When there are formed the EVOH layers in a plurality of numbers, it is desired that the total thickness of the plurality of layers is within the above-mentioned range.

As for the thicknesses of the other layers formed in the first multilayered container, further, though not limited thereto only, it is desired that the oxygen-absorbing layer has a thickness in a range of 10 to 60 μm and, specifically, 20 to 40 μm. When the reground resin layer is provided, it is desired that its thickness is in a range of 50 to 350 μm. Further, when the adsorbent-containing layer is provided, it is desired that its thickness is in a range of 10 to 100 μm. This makes it possible to produce the gas-barrier property and the oxygen-absorbing property to a sufficient degree without impairing the shock resistance or the formability, as well as to improve the flavor-retaining property.

[Gas-Barrier Layers]

In the first multilayered container, it is essential that the gas-barrier layer is formed by using the above-mentioned ethylene-vinyl alcohol copolymer. This, however, is not to exclude the formation of other layers by using other gas-barrier resins.

As the gas-barrier resins other than the ethylene-vinyl alcohol copolymer, there can be exemplified such polyamides as nylon 6, nylon 6,6, nylon 6/6,6 copolymer, metaxylylenediadipamide (MXD6), nylon 6,10, nylon 11, nylon 12 and nylon 13. Among these polyamides, preferred are those having amide groups in a number in a range of 5 to 50 and, specifically, 6 to 20 per 100 carbon atoms.

Further, when a polyamide is used as the matrix resin of the oxygen-absorbing resin composition that will be described later, it is desired to use the polyamide resin having terminal amino groups at a concentration of not less than 40 eq/$10^6$ g since it is not deteriorated by oxidation despite it has absorbed oxygen.

[Oxygen-Absorbing Layers]

In the multilayered container of the present invention, the oxygen-absorbing layer can be formed by using an oxygen-absorbing resin composition that comprises the above-mentioned propylene type polymer, gas-barrier resin or reground resin as the matrix resin, and that contains at least an oxidizing organic component and a transition metal catalyst (oxidizing catalyst).

(i) Oxidizing Organic Components

The oxidizing organic component can be an ethylenically unsaturated group-containing polymer having a carbon-carbon double bond. The double-bonded portion and the α-methylene neighboring the double-bonded portion are easily oxidized with oxygen and thus work to trap oxygen.

As the ethylenically unsaturated group-containing polymer that works as an oxidizing polymer, there can be used a homopolymer of polyene that is derived with the polyene as a monomer, a random copolymer of a combination of two or more kinds of polyenes, further, combined with any other monomers, or a block copolymer thereof.

Among the polymers derived from the polyene, preferred examples are polybutadiene (BR), polyisoprene (IR), natural rubber, nitrile-butadiene rubber (NBR), styrene-butadiene rubber (SBR), chloroprene rubber, ethylene-propylene-diene rubber (EODM) and the like to which only, however, the invention is in no way limited.

In addition to the above-mentioned ethylenically unsaturated group-containing polymers, there can be also used, as oxidizing organic components, the polymers which are subject to be oxidized by themselves, such as polypropylene, ethylene.propylene copolymer and polymetaxylylenediadipamide having a terminal amino group concentration of less than 40 eq/$10^6$ g.

Here, from the standpoint of formability, it is desired that the above-mentioned oxidizing polymers and copolymers thereof have viscosities at 40° C. in a range of 1 to 200 Pa·s.

It is desired that these polyene type polymers are acid-modified polyene polymers to which carboxylic acid groups, carboxylic anhydride groups or hydroxyl groups have been introduced.

The oxidizing organic component comprising these oxidizing polymers or copolymers thereof are desirably contained in the oxygen-absorbing resin composition in an amount of 0.01 to 10% by weight.

(ii) Transition Metal Type Catalysts

As the transition metal type catalyst, there can be favorably used metals of the Group VIII of periodic table, such as iron, cobalt and nickel. There can be also used metals of the Group I, such as copper and silver, metals of the Group IV, such as tin, titanium and zirconium, metals of the Group V, such as vanadium, metals of the Group VI, such as chromium, and metals of the Group VII, such as manganese.

The transition metal catalysts are, usually, used in the form of low-valence inorganic salts of the above transition metals, organic salts thereof, or complexes thereof. As the inorganic salts, there can be exemplified halides such as chlorides, oxysalts of sulfur such as sulfates, oxyacid salts of nitrogen such as nitrates, phosphorus oxysalts such as phosphates, and silicates. As the organic salts, there can be exemplified carboxylates, sulfonates and phosphonates. As the complex of the transition metal, there can be exemplified a complex with β-diketone or β-ketoacid ester.

The transition metal type catalyst is contained in the oxygen-absorbing resin composition at a concentration in a range of, desirably, 100 to 3,000 ppm in terms of a concentration of the transition metal atoms (weight concentration basis).

[Adhesive Layers]

In the multilayered container of the present invention, an adhesive layer may be formed between the layers, as required.

As the adhesive resin used for the adhesive layer, there can be exemplified thermoplastic resins that have, on the main chains or side chains thereof, carbonyl (—CO—) groups based on carboxylic acid, carboxylic anhydride, carboxylate, carboxylic acid amide or carboxylic acid ester at a concentration of 1 to 700 milliequivalents (meq)/100 g of resin and, specifically, 10 to 500 (meq)/100 g of resin.

Suitable examples of the adhesive resin include ethylene-acrylic acid copolymer, ionically crosslinked olefin copolymer, maleic anhydride-grafted polyethylene, maleic anhydride-modified polypropylene, maleic anhydride-grafted polypropylene, acrylic acid-grafted polyolefin, ethylene-vinyl acetate copolymer, and a blend of an ethylene-vinyl alcohol copolymer and a maleic anhydride-modified olefin resin. There can be specifically preferably used the maleic anhydride-modified polypropylene and the maleic anhydride-grafted polypropylene. The adhesive resins may be used in one kind or in a combination of two or more kinds. Or the adhesive resins may be used being added to the polyolefin type resin.

[Adsorbent-Containing Layer]

In the multilayered container of the present invention, the adsorbent-containing layer is formed as required. In this case, the adsorbent-containing layer is formed, desirably, on the inside of the oxygen-absorbing layer in order to suppress by-products generated by the oxygen-absorbing reaction from migrating into the container and thereby to improve the property for retaining the flavor of the content.

The adsorbent is, desirably, added to the propylene type polymer and the reground resin.

There can be used an adsorbent that has heretofore been known, such as a porous inorganic material comprising chiefly a silicate, e.g., a powder of active clay obtained by treating, with acid, a smectite clay mineral such as zeolite or montmorillonite. Specifically, a high silica zeolite (silica/alumina ratio of not less than 100) which is the Na-type ZSM5 zeolite is preferred having excellent function for trapping odor specific to the plastics and for trapping products decomposed by oxidation.

Usually, the adsorbent is contained in the adsorbent-containing layer in an amount of, desirably, 0.5 to 10% by weight.

(Second Multilayered Container)

It is an important feature of the present invention that the second multilayered container includes at least an outermost layer of a propylene type polymer A comprising chiefly a homopolypropylene having an MFR of 2.0 to 10.0 g/10 min. and an inner layer of a propylene type polymer B comprising chiefly a homopolypropylene having an MFR of not more than 1.0 g/10 min.

[Propylene Type Polymer A]

The propylene type polymer A constitutes the outermost layer of the second multilayered container. It is here desired that the propylene type polymer A chiefly comprises the homopolypropylene having an MFR in a range of 2.0 to 10.0 g/10 min. (hereinafter this homopolypropylene is often referred to as "high-MFR homopolypropylene"). Namely, it is desired that the propylene type polymer A contains the high-MFR homopolypropylene in an amount of not less than 80% by weight and, specifically, in an amount of 100% by weight.

The homopolypropylene has the MFR desirably in a range of 2.0 to 10.0 g/10 min. and, specifically, 2.0 to 5.0 g/10 min.

When the MFR is smaller than the above range, the fluidity becomes poor and the surface luster of the multilayered container cannot be obtained as desired. When the MFR is larger than the above range, on the other hand, there occurs drawdown to impair the surface luster and, besides, the shock resistance of the multilayered container may decrease. It is desired that the homopolypropylene has a high degree of crystallinity with an isotactic index of not less than 90% and, specifically, not less than 95%.

As the other propylene type polymers that can be contained in the propylene type polymer A, there can be exemplified propylene.α-olefin random copolymers. As the α-olefin in the propylene.α-olefin random copolymers, there can be exemplified ethylene, butene-1, pentene-1, hexene-1, octene-1, and 4-methylpentene-1. Specifically, there can be exemplified a propylene.ethylene random copolymer that contains the propylene structural units in an amount of not less than 80% by weight and, specifically, 95 to 99% by weight, the remaining structural units being α-olefin and, specifically, ethylene.

Further, the propylene type polymer A may be added with additives that have been customarily used for the resins, such as heat stabilizer, antioxidant, lubricant, inorganic filler, coloring agent and the like according to a known recipe.

[Propylene Type Polymer B]

In the second multilayered container, it is desired that the propylene type polymer B that constitutes at least the inner layer chiefly comprises the homopolypropylene having an MFR of not more than 1.0 g/10 min. (hereinafter this homopolypropylene is often referred to as "low-MFR homopolypropylene"). Namely, it is desired that the propylene type polymer B contains the low-MFR homopolypropylene in an amount of not less than 80% by weight and, specifically, in an amount of 100% by weight.

The homopolypropylene has the MFR which is desirably not more than 1.0 g/10 min. and, specifically, in a range of 0.3 to 1.0 g/10 min. When the MFR is larger than the above range, the multilayered container fails to acquire a desired shock resistance. When the MFR is too small, on the other hand, the fluidity becomes poor and the formability may be impaired.

It is desired that the homopolypropylene has a high degree of crystallinity with an isotactic index of not less than 90% and, specifically, not less than 95%. This enables the inner layer to possess improved mechanical strength and, therefore, the multilayered container to possess markedly improved shock resistance. Moreover, the shape can be retained without being melted up to a high-temperature region, making it possible to decrease the drawdown and to impart the heat resistance during the forming.

Since the low-MFR homopolypropylene that constitutes the propylene type polymer B possesses the isotactic index that lies within the above-mentioned range, it is now made possible to markedly improve the shock resistance and the heat resistance while decreasing the drawdown.

Further, as described concerning the propylene type polymer A above, the propylene type polymer B, too, may contain other propylene type polymers and known additives for resins, such as heat stabilizers and the like. Here, however, in order to further increase the crystallinity as well as the shock resistance of the propylene type polymers A and B, it is desired to add a nucleating agent.

The nucleating agents can be those as exemplified for the first multilayered container. The nucleating agent is added in an amount of, desirably, 0.001 to 5 parts by weight and, specifically, 0.01 to 0.5 parts by weight per 100 parts by weight of each of the propylene type polymers A and B. When the amount of the nucleating agent is smaller than the above range, the crystallinity cannot be increased to a sufficient degree. When the amount thereof is larger than the above range, on the other hand, the formability may be impaired.

[Multilayered Structures]

The second multilayered container is constituted essentially by the outermost layer of the propylene type polymer A that comprises the above-mentioned high MFR homopolypropylene and the inner layer of the propylene type polymer B that comprises the low-MFR homopolypropylene. Namely, the second multilayered container may be the one that has the above two layers, but may also have any other known layers such as a gas-barrier layer, an oxygen-absorbing layer, an adhesive layer, a reground resin layer, an adsorbent-containing layer, and the like layers. Described below are some examples of the layer constitution though the invention is not limited thereto only.

Figure 5:
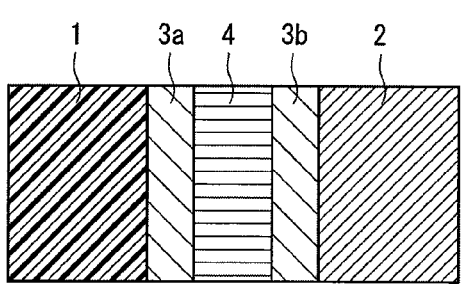
FIG. 5 It is a view illustrating a layer constitution of a second multilayered container of the present invention.

FIG. 5 illustrates an example comprising the outermost layer 1 of the propylene type polymer A, the inner layer 2 of the propylene type polymer B, and a gas-barrier layer as the intermediate layer. Namely, FIG. 5 illustrates a layer constitution comprising, from the outer layer side in order, outer layer 1/adhesive layer 3a on the outer layer side/gas-barrier layer 4/adhesive layer 3b on the inner layer side/inner layer 2. In this case, gas-barrier property is imparted to the multilayered container.

Figure 6:
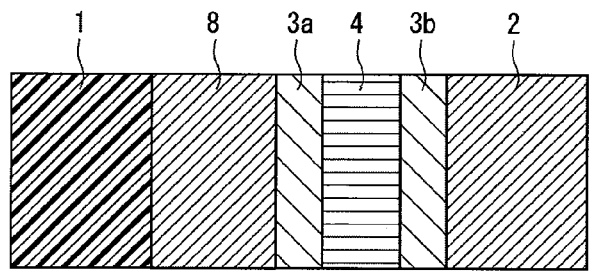
FIG. 6 It is a view illustrating another layer constitution of the second multilayered container of the present invention.

An embodiment shown in FIG. 6 comprises outermost layer 1/layer 8 of the propylene type polymer B/adhesive layer 3a on the outer layer side/gas-barrier layer 4/adhesive layer 3b on the inner layer side/inner layer 2. Further, an embodiment shown in FIG. 7 comprises outermost layer 1/adhesive layer 3a on the outer layer side/gas-barrier layer 4a/adhesive layer 3c/oxygen-absorbing layer 5 with the propylene type polymer B as the matrix resin/adhesive layer 3d/gas-barrier layer 4b/adhesive layer 3b on the inner layer side/inner layer 2. By forming the layer of the propylene type polymer B in addition to the inner layer, it becomes possible to further improve the shock resistance of the multilayered container and, specifically, to improve the shock resistance even on the side of the outermost layer that is formed of the propylene type polymer A having poor shock resistance.

Figure 7:
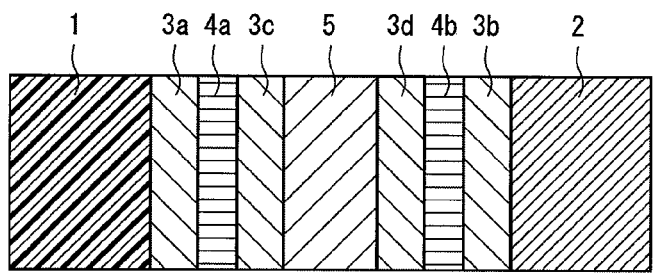
FIG. 7 It is a view illustrating a further layer constitution of the second multilayered container of the present invention.
Figure 8:
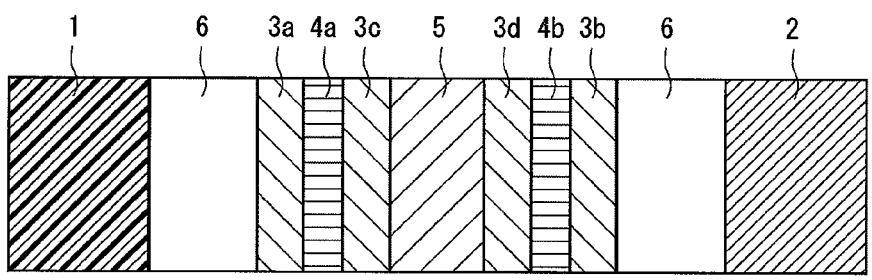
FIG. 8 It is a view illustrating a still further layer constitution of the second multilayered container of the present invention.

In the embodiment of FIG. 7 as shown in FIG. 8, furthermore, it is also allowable to form a reground resin layer 6 between the outermost layer 1 and the gas-barrier layer 4a and between the inner layer 2 and the gas-barrier layer 4b, the reground resin layer 6 being formed by using a reground resin generated during the formation of the containers.

Figure 9:
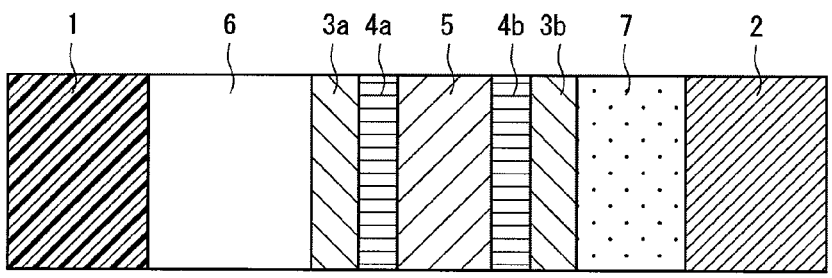
FIG. 9 It is a view illustrating a yet further layer constitution of the second multilayered container of the present invention.

Furthermore, an embodiment shown in FIG. 9 comprises outermost layer 1/reground resin layer 6/adhesive layer 3a on the outer layer side/gas-barrier layer 4a/oxygen-absorbing layer 5 with the gas-barrier resin as the matrix resin/gas-barrier layer 4b/adhesive layer 3b on the inner layer side/adsorbent-containing layer 7/inner layer 2. By forming the adsorbing layer 7 containing an adsorbent such as zeolite on the inner layer side, it is allowed to improve the property for retaining the flavor of the content.

The thicknesses of the layers of the second multilayered container may vary depending on the form of the multilayered container and the method of production, and cannot be definitely specified. As will be described later, when the heat forming such as air pressure forming is employed, however, it is desired that the outermost layer has a thickness in a range of 10 to 80 µm and, specifically, 20 to 60 µm while the inner layer has a thickness in a range of 390 to 320 µm and, specifically, 380 to 340 µm in the body portion that is the thinnest portion of the multilayered container. When the layer of the propylene type polymer B is formed in addition to the inner layer, it is desired that the total thickness of such a layer and the inner layer lies within the above range.

In the body portion of the multilayered container, further, it is desired that the outermost layer of the propylene type polymer A has a thickness that is not more than 20% and, specifically, not more than 10% of the total thickness of the container. Upon controlling the thickness of the outermost layer of the propylene type polymer A and the thickness of the inner layer of the propylene type polymer B (inclusive of other layers of the propylene type polymer B in addition to the inner layer), it is made possible to maintain surface luster of the multilayered container yet imparting excellent shock resistance in good balance.

As for the thicknesses of the other layers included in the second multilayered container, it is desired that the gas-barrier layer has a thickness (a total thickness when there are formed a multiplicity of such layers) in a range of 20 to 80 µm and, specifically, 40 to 60 µm, and the oxygen-absorbing layer has a thickness in a range of 10 to 60 µm and, specifically, 20 to 40 µm provided the outermost layer and the inner layer have thicknesses lying within the above-mentioned ranges. Further, when the reground resin layer is formed, it is desired that the thickness thereof (a total thickness when there are formed a multiplicity of such layers) is in a range of 50 to 350 µm. This enables the container to exhibit the gas-barrier property and the oxygen-absorbing property to a sufficient degree without impairing the shock resistance or the formability.

[Gas-Barrier Layer]

In the second multilayered container, the gas-barrier layer can be formed by using a known gas-barrier resin but, particularly preferably, is formed by using an ethylene-vinyl alcohol copolymer. From the standpoint of gas-barrier property, the ethylene-vinyl alcohol copolymer should, preferably, be a saponified product of a copolymer that is obtained by so saponifying an ethylene-vinyl acetate copolymer having an ethylene content of 20 to 60 mol % and, specifically, 25 to 50 mol % that the degree of saponification thereof is not less than 96% and, specifically, not less than 99 mol %.

In the second multilayered container, too, it is desired to use the ethylene-vinyl alcohol copolymer having an ethylene content of 20 to 35 mol % and the ethylene-vinyl alcohol copolymer having an ethylene content of 36 to 50 mol %, that are used in the first multilayered container, being blended at a ratio (weight ratio) of 90:10 to 50:50 and, specifically, 80:20 to 60:40. This enables the gas-barrier layer to be favorably formed yet maintaining excellent gas-barrier property and, therefore, makes it possible to form a multilayered container free of irregularity in the appearance.

It is also allowable to use a gas-barrier resin other than the ethylene-vinyl alcohol copolymers described above in connection with the first multilayered container.

[Other Layers]

The oxygen-absorbing layer, adhesive layer and adsorbent-containing layer in the second multilayered container can be the same layers as the layers described above in connection with the first multilayered container.

In the second multilayered container, the adsorbent is desirably added to the propylene type polymer B and the reground resin.

(Method of Producing the Multilayered Containers)

The multilayered container of the present invention can be produced by a known method of producing multilayered containers.

For example, a multilayered film or a multilayered sheet is prepared by the extrusion coating method, sandwich lamination or by the dry lamination of the films that have been formed in advance. The multilayered sheet is then subjected to the vacuum forming, air pressure forming, vacuum pressure forming or, further, to the plug-assisted heat forming. Or a bulky resin is extruded and compression-formed in order to obtain a multilayered container of the shape of a cup, a tray or the like.

Further, a preform having a predetermined layer structure is formed by the injection forming or the extrusion forming. The obtained preform is, thereafter, subjected to the melt forming such as blow forming. Or a molten resin is extruded so as to meet the preform in the multilayered die so that an intermediate layer resin is sealed therein. The preform is then cut at a portion where there is no intermediate layer resin, and is thrown into a mold followed by the compression forming with a core mold to thereby form a multilayered container of the shape of a bottle or the like.

In the present invention, among the above-mentioned forming methods, the heat forming is desired, such as vacuum forming or air pressure forming to form the multilayered container. Particularly preferably, the multilayered sheet of a thickness in a range of 250 to 4000 µm and, specifically, 800 to 2000 µm is formed into a container having an L/D ratio (mouth diameter (D) and a height (L)) in a range of 0.1 to 5 and, specifically, 0.2 to 1.5.

The container that is heat-formed, e.g., the container that is formed with the air pressure, can be determined by such methods as measuring the contraction factors before and after the retort treatment, observation with the polarized irradiation, and by the X-ray diffraction method. Upon being produced by the heat forming such as air pressure forming in which the multilayered sheet is stretched and oriented, the container that is obtained features excellent transparency and mechanical strength.

EXAMPLES

The invention will now be described by way of the following Examples and Comparative Examples to which only, however, the invention is in no way limited.

In the Examples and Comparative Examples, various measurements and evaluations were taken according to the methods described below.

(1) Isotactic Index (I.I.)

The isotactic index of the propylene type polymer was calculated as an isotactic fraction of the pentad units from the measurement of the nuclear magnetic resonance spectra (13C-NMR) by using an isotopic carbon. The 13C-NMR measurement was taken by using a nuclear magnetic resonator (manufactured by Nihon Denshi Co.) while being heated at 135° C. From the obtained chart, there was calculated a ratio of the height of a peak at 21.82 ppm to the total height of peaks at 21.82, 21.57, 21.31, 21.03, 20.82, 20.64, 20.29, 20.17 and 19.88 ppm, and from which an isotactic index was found.

(2) Melt Flow Rate (MFR)

The MFRs of the materials were measured by using a melt indexer (manufactured by Toyo Seiki Mfg. Co.) in compliance with the JIS K7210. Measurements were taken at temperatures of 210° C. and 230° C. under a load of 2160 g.

(3) Formability (Drawdown Resistance, Thickness Profile of the Container)

After the air pressure forming, the containers were evaluated to be "○" when they were drawn down little and maintained a uniform thickness profile and were evaluated to be "X" when they were drawn down to a large extent and could not maintain a uniform thickness profile.

(4) Appearance

As for the appearance, the obtained containers were judged with the eye in regard to if the EVOHs were even stretched. The containers were evaluated to be "○" when the side surface of the body portion had been evenly stretched, and were evaluated to be "X" when the side surfaces had not been evenly stretched.

(5) Oxygen-Barrier Property

The obtained container was filled with 1 g of pure water, hermetically sealed with an aluminum foil-laminated film in a gloved box that has been purged with nitrogen and was, thereafter, subjected to the shower type isostatic retort treatment under a sterilizing condition of 121° C. for 30 minutes. After the retort treatment, the container was stored in an environment of 30° C.80RH. After 2 weeks have passed, the oxygen concentration in the container was measured by gas chromatography. When the oxygen concentration in the container was not less than 1%, it could be suspected that the quality of the content might have been deteriorated. Therefore, the barrier property of the container was evaluated to be "○" when the oxygen concentration was less than 1% and was evaluated to be "X" when the oxygen concentration was not less than 1%.

(6) Tensile Shock Strength (Tensile Shock Test)

The tensile shock test was conducted by using a universal shock tester (manufactured by Toyo Seiki Mfg. Co.). The side surface of the body portion of the obtained container was cut out and measured. Namely, the tensile shock strength ($kJ/m^2$) was calculated from the tensile shock energy (kJ) and the sectional area ($m^2$). The larger the value of the tensile shock strength, the more excellent the shock resistance. When the value of the tensile shock strength was not smaller than 1000 $kJ/m^2$, the container could endure the drop of not less than 20 times. When the above value was less than 1000 $kJ/m^2$, however, the container broke after dropped several times. In the Examples, therefore, the shock resistance was evaluated to be ○ when the value of the tensile shock strength was not smaller than 1000 $kJ/m^2$ and was evaluated to be X when the value of the tensile shock strength was less than 1000 $kJ/m^2$.

(7) Luster

By using a digital angle glossmeter (manufactured by Suga Shikenki Co.), the side surface (outer side) of the body portion of a cup was measured for its 60° gloss. The larger the value of 60° gloss, the more excellent the luster. In the Examples, therefore, the luster was evaluated to be ○ when the value of 60° gloss was not less than 50% and X when the value of 60° gloss was less than 50%.

Described below are the materials used in Examples 1 to 5 and in Comparative Examples 1 to 4, as well as values described in the catalogs and the data that were really measured.

Propylene type polymer (1): isotactic index: 98.3%, MFR=0.5 g/10 min. (230° C., load: 2160 g)

Propylene type polymer (2): isotactic index: 98.2%, MFR=3.5 g/10 min. (230° C., load: 2160 g)

Propylene type polymer (3): isotactic index: 92.4%, MFR=0.5 g/10 min. (230° C., load: 2160 g)

EVOH (1): ethylene content: 27 mol %, melting point: 191° C., MFR=4.0 g/10 min. (210° C., load: 2160 g)

EVOH (2): ethylene content: 44 mol %, melting point: 165° C., MFR=3.3 g/10 min. (210° C., load: 2160 g)

AD: maleic acid-modified resin, MFR=2.0 g/10 min. (230° C., load: 2160 g)

Example 1

By using a coextrusion multilayered sheet-forming machine, there was prepared a multilayered sheet of a layer constitution comprising a layer of the propylene type polymer A/adhesive resin (AD) layer/ethylene-vinyl alcohol copolymer (EVOH) layer/AD layer/layer of the propylene type polymer A. The layer of the propylene type polymer (1) contained a nucleating agent (organic phosphate) in an amount of 0.2 parts by weight per 100 parts by weight of the propylene type polymer (1). The EVOH layer was formed of a blend of EVOH (1) and EVOH (2) at a ratio of 80:20. Next, a material recovered as the multilayered sheet was pulverized and the propylene type polymer A were mixed together at a weight ratio of 50:50. 100 Parts by weight of this mixture was, further, mixed with 3 parts by weight of a compatibilizer, and the mixture thereof was used as a reground resin (Reg) to, further, form a sheet. The thus formed sheet possessed a sheet constitution (1) comprising a layer of the propylene type polymer (a)/Reg layer/AD layer/EVOH layer/AD layer/Reg layer/layer of the propylene type polymer (1).

Next, by using a far infrared ray heater, the thus formed multilayered sheet was heated to a temperature not higher than the melting point of the propylene type polymer and, by using a plug-assist air pressure forming machine, was formed into a container of a drawing ratio of 0.5 having a capacity of 110 ml.

The evaluated results were as shown in Table 1.

Example 2

A multilayered sheet and a container were prepared in the same manner as in Example 1 but using the propylene type polymer (2) instead of the propylene type polymer (1). The evaluated results were as shown in Table 1. The mechanical strength was inferior to that of Example 1 presumably because the propylene type polymer B possessed a high MFR and contained much low-molecular components.

Example 3

There was prepared a multilayered sheet of a layer constitution comprising a layer of the propylene type polymer (1)/AD layer/EVOH layer/oxygen-absorbing (Sc) layer/EVOH layer/AD layer/adsorbent-containing layer/layer of the propylene type polymer (1). The Sc layer was chiefly comprised of the mixture of the above-mentioned two kinds of EVOHs and, further, contained an oxidizing organic component and a transition metal catalyst. The adsorbent-containing layer was comprised of the polypropylene type polymer (1) that, further, contained synthetic zeolite. Next, by using the reground resin (Reg) like in Example 1, there was produced a container in the same manner as in Example 1 but forming a multilayered sheet (constitution 2) of the layer constitution comprising the layer of the propylene type polymer (1)/Reg layer/AD layer/EVOH layer/Sc layer/EVOH layer/AD layer/adsorbent-containing layer/layer of the propylene type polymer (1).

The evaluated results were as shown in Table 1.

Example 4

A multilayered sheet and a container were prepared in the same manner as in Example 1 but adding no nucleating agent to the layer of the propylene type polymer (1). The evaluated results were as shown in Table 1. The container failed to acquire the uniform thickness profile presumably because the layer of the propylene type polymer (1) possessed a melting point lower than that of Example 1 and was drawn down to a large extent. Moreover, the layer of the propylene type polymer (1) possessed a lower crystallization temperature than that of Example 1 accounting for a poor forming cycle.

Example 5

A multilayered sheet and a container were prepared in the same manner as in Example 1 but heating the multilayered sheet at a temperature that was not lower than the melting point of the propylene type polymer and using a plug-assist vacuum pressure forming machine. The evaluated results were as shown in Table 1. The mechanical strength was inferior to that of Example 1 presumably because with the vacuum pressure forming method that executed the forming at a temperature that was not lower than the melting point of the propylene type polymer, the multilayered sheet was neither stretched nor oriented.

Comparative Example 1

A container was prepared in the same manner as in Example 1 but forming a single layer of EVOH (1) as the EVOH layer. The evaluated results were as shown in Table 1. The EVOH (1) had a small ethylene content and could not be well stretched. Presumably, therefore, the body portion of the container was unevenly stretched.

Comparative Example 2

A container was prepared in the same manner as in Example 1 but forming a single layer of EVOH (2) as the EVOH layer. The evaluated results were as shown in Table 1. The EVOH (1) had a large ethylene content and could be excellently stretched but lacked the barrier property.

Comparative Example 3

It was attempted to prepare a container in the same manner as in Example 1 but using the propylene type polymer (3) instead of the propylene type polymer (1). The evaluated results were as shown in Table 1. The multilayered sheet was so drawn down that it could not be formed into the container. This was presumably due to that the propylene type polymer (3) possessed a too low isotactic index.

Comparative Example 4

It was attempted to prepare a container in the same manner as in Example 1 but using the propylene type polymer (3) instead of the propylene type polymer (1) and forming a single layer of EVOH (1) as the EVOH layer. The evaluated results were as shown in Table 1. The multilayered sheet was so drawn down that it could not be formed into the container. This was presumably due to that the propylene type polymer (3) possessed a too low isotactic index. Besides, the EVOH (1) had a low ethylene content and could not be well stretched. Presumably, therefore, the body portion of the container was unevenly stretched.

TABLE 1

| | PP | | Blending ratio in the EVOH layer (wt %) | | Evaluation | | | |
|---|---|---|---|---|---|---|---|---|
| | I.I. | MFR | EVOH (1) | EVOH (2) | Formability | Appearance | Barrier property | Remarks |
| Ex. 1 | 98.3 | 0.5 | 80 | 20 | ○ | ○ | ○ | |
| Ex. 2 | 98.2 | 3.5 | 80 | 20 | ○ | ○ | ○ | poor mechanical strength |
| Ex. 3 | 98.3 | 0.5 | 80 | 20 | ○ | ○ | ○ | |
| Ex. 4 | 98.3 | 0.5 | 80 | 20 | X | ○ | X | thickness was not uniform |
| Ex. 5 | 98.3 | 0.5 | 80 | 20 | ○ | ○ | ○ | poor mechanical strength |
| Comp. Ex. 1 | 98.3 | 0.5 | 100 | 0 | ○ | X | X | unevenly stretched |
| Comp. Ex. 2 | 98.3 | 0.5 | 0 | 100 | ○ | ○ | X | poor barrier property |
| Comp. Ex. 3 | 92.4 | 0.5 | 80 | 20 | X | ○ | X | container could not be formed |
| Comp. Ex. 4 | 92.4 | 0.5 | 100 | 0 | X | X | X | container could not be formed |

Example 6

By using a coextrusion multilayered sheet-forming machine, there was prepared a multilayered sheet of a layer constitution comprising an outermost layer of the propylene type polymer A/outer layer of the propylene type polymer B/adhesive resin (AD) layer/ethylene-vinyl alcohol copolymer (EVOH) layer/AD layer/inner layer of the propylene type polymer B. The resins used for forming the layers were:
- the propylene type polymer A, MFR=3.5 g/10 min. (230° C., load; 2160 g), isotactic index=98.2%,
- the propylene type polymer B, MFR=0.5 g/10 min. (230° C., load; 2160 g), isotactic index=98.3%, and
- the adhesive resin, MFR=2.0 g/10 min. (230° C., load: 2160 g).

The EVOH layer was formed of a resin composition which was a blend of two kinds of EVOHs having different ethylene contents. A nucleating agent was added to the propylene type polymer A and to the propylene type polymer B.

Next, by using a far infrared ray heater, the obtained multilayered sheet was heated at a temperature which was not higher than the melting point of the propylene type polymer B and was formed into a container by using the plug-assist air pressure forming machine.

The results of shock resistance (tensile shock resistance) and luster (60° gloss) were as shown in Table 2.

Example 7

A container was prepared in the same manner as in Example 6 but forming a multilayered sheet of a constitution of outermost layer of the propylene type polymer A/outer layer of the propylene type polymer B/AD layer/EVOH layer/oxygen-absorbing (Sc) layer/EVOH layer/AD layer/adsorbent-containing layer/inner layer of the propylene type polymer B. The Sc layer was chiefly comprised of the mixture of the above-mentioned two kinds of EVOHs and, further, contained an oxidizing organic component and a transition metal catalyst. The adsorbent-containing layer was chiefly comprised of the polypropylene and contained the adsorbent. The results of shock resistance (tensile shock resistance) and luster (60° gloss) were as shown in Table 2.

Example 8

A multilayered sheet and a container were prepared in the same manner as in Example 6 but heating the propylene type polymer B at a temperature which was not lower than its melting point at the time of preparing the container. The evaluated results were as shown in Table 2. The mechanical strength was inferior to that of Example 6 presumably because with the vacuum pressure forming method that executed the forming at a temperature that was not lower than the melting point of the propylene type polymer, the multilayered sheet was neither stretched nor oriented.

Example 9

A multilayered sheet and a container were prepared in the same manner as in Example 7 but heating the propylene type polymer B at a temperature that was not lower than its melting point at the time of preparing the container. The evaluated results were as shown in Table 2. The mechanical strength was inferior to that of Example 7 presumably because with the vacuum pressure forming method that executed the forming at a temperature that was not lower than the melting point of the propylene type polymer, the multilayered sheet was neither stretched nor oriented.

Comparative Example 5

A multilayered sheet and a container were prepared in the same manner as in Example 6 but forming the outermost layer using the propylene type polymer B instead of the propylene type polymer A. The evaluated results were as shown in Table 2. The luster was poor presumably due to the use of the propylene type polymer B having an MFR=0.5 g/10 min. for forming the outermost layer.

Comparative Example 6

A multilayered sheet and a container were prepared in the same manner as in Example 6 but forming the outer layer and the inner layer using the propylene type polymer A instead of the propylene type polymer B. The evaluated results were as shown in Table 2. The shock resistance was poor presumably due to the use of the propylene type polymer A having an MFR=3.5 g/10 min. for forming the outer layer and the inner layer.

Comparative Example 7

A multilayered sheet and a container were prepared in the same manner as in Example 7 but forming the outermost layer using the propylene type polymer B instead of the propylene type polymer A. The evaluated results were as shown in Table 2. The luster was poor presumably due to the use of the propylene type polymer B having an MFR=0.5 g/10 min. for forming the outermost layer.

Comparative Example 8

A multilayered sheet and a container were prepared in the same manner as in Example 7 but forming the outer layer and the inner layer using the propylene type polymer A instead of the propylene type polymer B. The evaluated results were as shown in Table 2. The shock resistance was poor presumably due to the use of the propylene type polymer A having an MFR=3.5 g/10 min. for forming the outer layer and the inner layer.

TABLE 2

| | Shock resistance | | Luster | | |
|---|---|---|---|---|---|
| | Tensile impact strength (kJ/m$^2$) | Evaluation | 60° Gloss (%) | Evaluation | Remarks |
| Ex. 6 | 1588 | ○ | 72 | ○ | luster and shock resistance attained |
| Ex. 7 | 1720 | ○ | 70 | ○ | luster and shock resistance attained |
| Ex. 8 | 1493 | ○ | 78 | ○ | luster and shock resistance attained |
| Ex. 9 | 1425 | ○ | 75 | ○ | luster and shock resistance attained |
| Comp. Ex. 5 | 1460 | ○ | 32 | X | poor luster |
| Comp. Ex. 6 | 740 | X | 75 | ○ | poor shock resistance |
| Comp. Ex. 7 | 1522 | ○ | 30 | X | poor luster |
| Comp. Ex. 8 | 780 | X | 70 | ○ | poor shock resistance |

INDUSTRIAL APPLICABILITY

The first multilayered container of the invention is evenly stretched, and features excellent gas-barrier property, excellent transparency and excellent appearance. The second multilayered container, too, has particularly excellent surface luster and shock resistance.

Moreover, being provided with the oxygen-absorbing layer, the multilayered containers of the invention are capable of expressing excellent oxygen-barrier property for extended periods of time. Moreover, being, further, provided with the adsorbent-containing layer, the multilayered containers of the invention are capable of effectively suppressing a decrease in the flavor of the contents caused as they are oxidized and decomposed accompanying the oxygen-absorbing reaction. Therefore, the multilayered containers of the invention can be effectively used as containers for containing a variety of contents such as beverages and foods and, specifically, as containers for containing the contents that are to be subjected to the heat-sterilization such as retort-sterilization.

Concrete examples of the contents that can be contained may be, though not limited thereto only, beverages such as beer, wine, fruits juice, carbonated soft drinks, etc., as well as fruits, nuts, vegetables, meat products, infant's foods, coffee, jam, mayonnaise, ketchup, edible oils, dressings, sauces, foods boiled in soy sauce, milk products, processed fish, baby foods, pet foods, and various other contents that are subject to deteriorate in the presence of oxygen, such as pharmaceuticals, cosmetics, gasoline and the like.

DESCRIPTION OF REFERENCE NUMERALS

| 1 outer layer | 2 inner layer | 3 adhesive layer |
| --- | --- | --- |
| 4 gas-barrier layer | 5 oxygen-absorbing layer | |
| 6 reground resin layer | 7 adsorbent-containing layer | |

The invention claimed is:

1. A multilayered container having at least a layer of a propylene type polymer which includes a homopolypropylene having an isotactic index of not less than 93%, in an amount of not less than 80% by weight, and a layer of an ethylene-vinyl alcohol copolymer having not less than two crystal melting peak temperatures, wherein
the multilayered container has a layer constitution which includes a layer of the propylene type polymer/a reground resin layer/an adhesive resin layer/a first intermediate layer of an ethylene-vinyl alcohol copolymer/an oxygen-absorbing layer/a second intermediate layer of an ethylene-vinyl alcohol copolymer/an adhesive resin layer/an adsorbent-containing layer/an inner layer of the propylene type polymer in this order from the outer side, wherein at least one of the first and second intermediate layers of an ethylene-vinyl alcohol copolymer is the ethylene-vinyl alcohol copolymer having not less than two crystal melting peak temperatures.

2. The multilayered container according to claim 1, wherein the first and second intermediate layers of the ethylene-vinyl alcohol copolymer include a blend of two or more kinds of ethylene-vinyl alcohol copolymers having different ethylene contents, and have crystal melting peak temperatures which are at least not lower than 180° C. and not higher than 170° C.

3. The multilayered container according to claim 1, wherein the first and second intermediate layers of the ethylene-vinyl alcohol copolymer include a blend of an ethylene-vinyl alcohol copolymer having an ethylene content of 20 to 35 mol % and an ethylene-vinyl alcohol copolymer having an ethylene content of 36 to 50 mol %, at a blending ratio of 90:10 to 50:50.

4. The multilayered container according to claim 1, wherein the propylene type polymer contains a nucleating agent.

5. The multilayered container according to claim 1, wherein the propylene type polymer comprises a homopolypropylene having a melt flow rate of not more than 2.0 g/10 min., in an amount of not less than 80% by weight.

6. A multilayered container having at least an outermost layer of a propylene type polymer A which includes a homopolypropylene having a melt flow rate of 2.0 to 10.0 g/10 min., in an amount of not less than 80% by weight; an inner layer of a propylene type polymer B which includes a homopolypropylene having a melt flow rate of not more than 1.0 g/10 min., in an amount of not less than 80% by weight; an intermediate layer of an ethylene-vinyl alcohol copolymer formed between the outermost layer and the inner layer, and a layer containing the propylene type polymer B formed between the intermediate layer of the ethylene-vinyl alcohol copolymer and the outermost layer, wherein
an isotactic index of not less than 95% is possessed by the homopolypropylene which is the chief component of the propylene type polymer A and the propylene type polymer B.

7. The multilayered container according to claim 6, wherein the ratio of thickness of the outermost layer is not more than 20% relative to the total thickness of the container.

8. The multilayered container according to claim 6, wherein the propylene type polymer A and the propylene type polymer B contain a nucleating agent.

9. The multilayered container according to claim 6, wherein the intermediate layer of the ethylene-vinyl alcohol copolymer includes a blend of two or more kinds of ethylene-vinyl alcohol copolymers having different ethylene contents.

10. The multilayered container according to claim 6, wherein the multilayered container has a layer constitution which includes the outermost layer/a reground resin layer/an adhesive resin layer/an intermediate layer of an ethylene-vinyl alcohol copolymer/an oxygen-absorbing layer/an intermediate layer of an ethylene-vinyl alcohol copolymer/an adhesive resin layer/an adsorbent-containing layer/the inner layer in this order from the outer side.

* * * * *